United States Patent
Bechtold et al.

(10) Patent No.: US 6,907,368 B2
(45) Date of Patent: Jun. 14, 2005

(54) METHOD AND DEVICE FOR DETECTING A PULSE-TYPE MECHANICAL EFFECT ON A SYSTEM PART

(75) Inventors: Bela Bechtold, Möhrendorf (DE); Peter Jax, Erlangen (DE); Dieter Wiemerslage, Untermembach (DE)

(73) Assignee: Framatome ANP GmbH, Erlangen (DE)

(*) Notice: Subject to any disclaimer, the term of this patent is extended or adjusted under 35 U.S.C. 154(b) by 0 days.

(21) Appl. No.: 10/924,319

(22) Filed: Aug. 23, 2004

(65) Prior Publication Data

US 2005/0021267 A1 Jan. 27, 2005

Related U.S. Application Data

(63) Continuation of application No. PCT/EP03/01786, filed on Feb. 21, 2003.

(30) Foreign Application Priority Data

Feb. 22, 2002 (DE) .......................................... 102 07 455

(51) Int. Cl.[7] .......................... G06F 19/00; G01H 1/00; G01M 1/22
(52) U.S. Cl. .......................... 702/78; 702/35; 702/56; 702/189; 73/660; 340/683
(58) Field of Search ................................ 702/33–35, 39, 702/41–43, 56, 75–78, 113–115, 179, 182–185, 189–191; 60/223; 73/570, 572, 584, 593, 659, 665; 700/175, 176; 340/679, 680, 683, 855.6, 566

(56) References Cited

U.S. PATENT DOCUMENTS

| | | | |
|---|---|---|---|
| 4,425,798 A | 1/1984 | Nagai et al. ................... 73/659 |
| 4,888,948 A | 12/1989 | Fisher et al. ................... 60/223 |
| 5,407,265 A | * 4/1995 | Hamidieh et al. .......... 340/680 |
| 5,479,826 A | 1/1996 | Twerdochlib et al. ......... 73/660 |
| 5,943,634 A | 8/1999 | Piety et al. .................... 702/56 |
| 6,191,727 B1 | * 2/2001 | Springer et al. ............ 342/195 |
| 6,208,944 B1 | 3/2001 | Franke et al. ................. 702/56 |
| 6,494,046 B1 | 12/2002 | Hayess ........................ 60/779 |
| 6,499,350 B1 | 12/2002 | Board et al. .................. 73/660 |
| 2001/0021258 A1 | 9/2001 | Nagel ......................... 381/71.4 |
| 2001/0023582 A1 | 9/2001 | Nagel .......................... 60/204 |

FOREIGN PATENT DOCUMENTS

| | | |
|---|---|---|
| DE | 695 12 657 T2 | 12/1995 |
| DE | 195 45 008 C2 | 6/1997 |
| DE | 197 27 114 C2 | 2/1999 |
| DE | 198 43 615 C2 | 4/2000 |
| DE | 198 57 552 A1 | 6/2000 |
| WO | 95/35484 | 12/1995 |
| WO | 00/55585 | 9/2000 |
| WO | 01/75272 A2 | 10/2001 |

* cited by examiner

Primary Examiner—Marc S. Hoff
Assistant Examiner—Manuel L. Barbee
(74) Attorney, Agent, or Firm—Laurence A. Greenberg; Werner H. Stemer; Ralph E. Locher

(57) ABSTRACT

A method and device for detection of a pulsed mechanical effect on a plant component includes continuously recording an operating noise in the plant component with a sensor disposed on the plant component and converting the recorded noise into a measured signal with the sensor. Then, the measured signal is subjected to a Fourier transformation. An evaluation function is derived from a number of value spectra determined in the above manner, which gives the onset of a pulsed mechanical effect on the plant component.

11 Claims, 4 Drawing Sheets

METHOD AND DEVICE FOR DETECTING A PULSE-TYPE MECHANICAL EFFECT ON A SYSTEM PART

CROSS-REFERENCE TO RELATED APPLICATION

This application is a continuation, under 35 U.S.C. § 120, of copending international application No. PCT/EP03/01786, filed Feb. 21, 2003, which designated the United States; this application also claims the priority, under 35 U.S.C. § 119, of German patent application No. 102 07 455.0, filed Feb. 22, 2002; the prior applications are herewith incorporated by reference in their entirety.

BACKGROUND OF THE INVENTION

Field of the Invention

The invention relates to a method and to a device for detecting a pulse-type mechanical effect on a system part.

There is a need in a multiplicity of applications to monitor continuously the proper operation of a system part, for example, a pipeline in chemical process engineering or a fluid-flow machine, to detect disturbances in good time and to avoid serious consequential damage. A multiplicity of methods for such monitoring are known in the prior art. European Patent 0 765 466 B1, corresponding to U.S. Pat. No. 5,479,826 to Twerdochlib et al., proposes, for example, to undertake the monitoring of the vibrations of turbine blades with the aid of microwaves that are directed onto the turbine blades. Conclusions may be drawn on the turbine's state of vibration from the modulation of the microwaves reflected at the turbine blades.

In the method known from German Published, Non-Prosecuted Patent Application DE 198 57 552 A1, corresponding to U.S. Pat. No. 6,494,046 to Hayess, the rupture of the shaft of a turbine is detected by measuring the rotational frequencies at the ends of the shaft.

It is proposed in German Patent DE 198 43 615 C2, corresponding to United States Patent Publication Nos. 2001/0023582A1 and 2001/0021258A1 to Nagel, to undertake the diagnosis of the state of a combustion drive with the aid of an analysis of the frequency spectrum of the measurement signals that are picked up with the aid of a sound pickup disposed in the air inlet region or exhaust gas region.

In German Patent DE 197 27 114 C2, corresponding to U.S. Pat. No. 6,208,944 to Franke et al., a machine is monitored by detecting the signals of structure-borne sound striking the machine, instead of the air noise. In this known method, as well, there is an analysis of the respectively determined frequency spectra of the measurement signals detected by the structure-borne sound pickup.

In the case of the method disclosed in German Patent DE 195 45 008 C2, as well, the frequency spectrum of the measurement acceleration pickup, is analyzed during the operation of the machine and compared with a reference frequency spectrum.

To be able to ascertain the intrusion of foreign parts into a gas turbine, in U.S. Pat. No. 4,888,948 to Fisher et al. there is disposed, at the inlet of the turbine, a sensor with which an electric charge induced by the foreign bodies is detected.

A particular problem is represented by loose parts that are entrained by the flow and strike the system part and that cause only a pulse-type, short-term effect that is correspondingly problematic to demonstrate reliably.

Such problems can occur, for example, in the case of gas turbines whose combustion chambers are lined with ceramic tiles for protection against overheating. These ceramic tiles are subjected to high dynamic loads by alternating pressure fluctuations occurring in the combustion chamber. It can happen, in such a case, that portions of the tiles on the respective holders break away, are entrained by the flow of exhaust gas, and strike the first guide-blade row of the gas turbine. Such action can lead to damage to the coating of the guide blades, and to destruction of the moving blades disposed therebehind. Moreover, there is the risk of a tile already damaged by the breaking away of portions becoming completely detached from the holders and, possibly, causing correspondingly massive damage to the gas turbine. In such a case, the occurrence of small loose parts or an individual tile indicates an impending total breaking away of a tile or a number of tiles and, so, switching off the gas turbine in good time and exchanging the damaged tiles prevent more extensive damage.

It is known, in principle, from International Publication WO 01/75272 A2, corresponding to U.S. Pat. No. 6,499,350 to Board et al., for monitoring such impacts on a system part to make use of suitable sensors to detect the impact by structure-borne sound thereby produced. However, particularly in the case of gas turbines, the problem arises that the normal level of operating noise is so high that even the signal component generated by the impact of a whole tile on the guide blade of the gas turbine is smaller than the background generated by the normal operating noises and, so, in particular, the occurrence of relatively small portions cannot be detected by simply monitoring the amplitudes of the signals of structure-borne sound.

SUMMARY OF THE INVENTION

It is accordingly an object of the invention to provide a method and device for detecting a pulse-type mechanical effect on a system part that overcome the hereinafore-mentioned disadvantages of the heretofore-known devices and methods of this general type and that improves the signal-to-noise ratio picked up by a measuring sensor to eliminate the signals of structure-borne sound produced in normal operation of the turbine.

With the foregoing and other objects in view, there is provided, in accordance with the invention, a method for detecting a pulse-type mechanical effect on a system part, including the steps of continuously detecting, with a sensor disposed on the system part, an operating noise present in the system part and converting the detected operating noise into a measurement signal, determining a magnitude of a frequency spectrum of the measurement signal in temporally sequential time segments at predefined frequencies, determining a deviation of the magnitude from a mean magnitude for each time segment and each of the predefined frequencies, deriving a single evaluation function common for all frequencies for each time segment from the deviations determined for each of the predefined frequencies, each deviation making a contribution to the evaluation function, and comparing the evaluation function with a threshold value, and utilizing an overshooting of the threshold value as an index for a presence of a pulse-type signal component indicating the mechanical effect.

In the method for detecting a pulse-type mechanical effect on a system part according to the invention, an operating noise present in the system part is detected continuously by a sensor disposed on the system part, and is converted by the sensor into a measurement signal. The following method steps are provided in accordance with the invention:

a) the magnitude of the frequency spectrum of the measurement signal is determined in temporally sequential time segments, preferably, mutually overlapping, at prescribed frequencies;

b) the deviation of the magnitude from a mean magnitude is determined for each time segment and each of the prescribed frequencies;

c) an evaluation function is derived for each time segment from the deviations determined for each of the prescribed frequencies; and d) the evaluation function is compared with a threshold value, and the overshooting of the threshold value is used as an index for the presence of a pulse-type signal component indicating the mechanical effect.

The invention is based on the consideration that the occurrence of a transient event (the pulse-type structure-borne sound generated by an impact) can be detected more easily in the frequency spectrum of the measurement signal picked up directly by the sensor than in the actual measurement signal. Because, moreover, the current frequency spectrum is compared with an averaged frequency spectrum for a multiplicity of frequencies, statistical outliers are largely suppressed and the sensitivity of the method is, correspondingly, raised.

Such a process permits the reliable detection even of relatively small fragments and, so, it is possible, in the case of monitoring a gas turbine, for example, to prevent relatively severe damage by virtue of the fact that the start of a complete loosening of a tile that is announced by the initial breaking away of relatively small fragments is detected, and damaged tiles can, still, be exchanged before they break away completely and cause severe damage to the gas turbine.

In accordance with another mode of the invention, the sequential time segments overlap one another.

In accordance with a further mode of the invention, the determining steps and the deriving and comparing steps are carried out with sequential time segments overlapping one another.

In accordance with an added mode of the invention, the mean magnitude is determined for each of the predefined frequencies from the magnitudes determined in different time segments by forming the sliding time mean. As a result, the mean frequency spectrum used for comparison is adapted to operating situations that vary slowly with time, for example, in the case of the occurrence of rumbling of the gas turbine.

In accordance with an additional mode of the invention, for each of the predefined frequencies, the standard deviation of the magnitudes from the mean magnitude is determined for a plurality of sequential time segments and the normalized deviation of the magnitude from the mean magnitude is determined with the aid of the standard deviation.

Subsequently, from the deviation, a current parameter value is formed for each time segment by forming the sum of the squares of each normalized deviation over each of the predefined frequencies that serves as the evaluation function.

In accordance with yet another mode of the invention, in particular a sliding mean parameter value is derived over a number of time segments, and the evaluation function is determined from the difference between the mean parameter value and the current parameter value. This, once again, significantly raises the sensitivity of the method, that is to say, the distance between the useful signal and background.

With the objects of the invention in view, there is also provided a device for detecting a pulse-type mechanical effect on a system part, including at least one sensor to be disposed on the system part, the at least one sensor continuously detecting and measuring an operating noise present in the system part and generating measurement signals therefrom, an A/D converter connected to the at least one sensor, the A/D converter digitizing the measurement signals detected by the at least one sensor and outputting digitized measurement signals, a digital device connected to the A/D converter and receiving the digitized measurement signals, the digital device being programmed to determine a magnitude of a frequency spectrum of the measurement signals in temporally sequential time segments for predefined frequencies, determine a deviation of the magnitude from a mean magnitude for each time segment and each of the predefined frequencies, derive a single evaluation function common for all frequencies for each time segment from the deviations determined for each of the predefined frequencies each deviation making a contribution to the evaluation function, and comparing the evaluation function with a threshold value and passing on an alarm signal upon an overshooting of the threshold value.

In accordance with yet a further feature of the invention, the digital device is programmed to provide mutually overlapping time segments.

In accordance with yet an added feature of the invention, the digital device is programmed to determine the mean magnitude for each of the predefined frequencies by forming a sliding time mean from the magnitudes determined in different time segments.

In accordance with yet an additional feature of the invention, the digital device is programmed to implement an algorithm determining a standard deviation of the magnitudes from the mean magnitude for each of the predefined frequencies for a plurality of sequential time segments, determining a normalized deviation of the magnitudes from the mean magnitude by dividing the deviation by the standard deviation, deriving a current parameter value for each time segment by forming a sum of squares of each normalized deviation over each of the predefined frequencies, and generating the evaluation function from the current parameter value.

In accordance with a concomitant feature of the invention, the algorithm further includes the step of forming a sliding mean parameter value and generating the evaluation function from a difference between the mean parameter value and the current parameter value.

Other features that are considered as characteristic for the invention are set forth in the appended claims.

Although the invention is illustrated and described herein as embodied in a method and device for detecting a pulse-type mechanical effect on a system part, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

Figure 1:
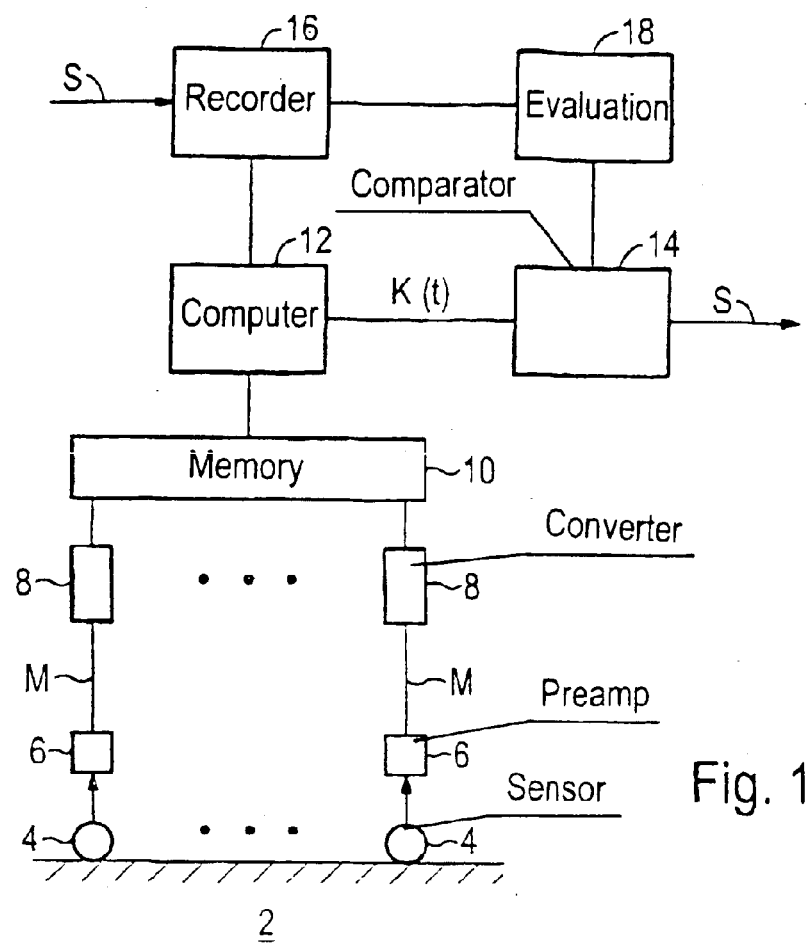
FIG. 1 is a block circuit diagram of an exemplary embodiment of a device in accordance with the invention.

Referring now to the figures of the drawings in detail and first, particularly to FIG. 1 thereof, there is shown, disposed on a system part 2, for example, a gas turbine, a plurality of sensors 4, in particular, piezoelectric acceleration pickups, that continuously detect the operating noise present in the system part 2 and propagating in the form of structure-borne noise. The sensors 4 convert the structure-borne noise signals into an electric measurement signal that is amplified in a preamplifier 6 and is passed on to a multiplexer analog-to-digital converter 8 that is connected to a digital memory 10. The amplified measurement signal M respectively present is digitized in this way, buffered, and passed on for further processing to a digital device, e.g., a computer, 12 in which the evaluation algorithm according to the invention is implemented.

The computer 12 includes, for each channel, a processor for fast Fourier transformation FFT of the data passed on by the analog-to-digital converter 8, as well as a ring memory for storing a number N of the spectra determined by the Fourier transformation. Using an algorithm implemented in the computer 12 and to be explained in more detail below, an evaluation function K(t) dependent on time t is determined for each channel from the so-called discrete Fourier transform determined in the computer 12; the evaluation function is compared in a comparator 14 with a prescribed threshold value $K_0$. Overshooting of the threshold value $K_0$ serves as an index for the presence of a pulse-type signal component caused by transient mechanical effects and generates a corresponding trigger signal S. The trigger signal S is fed to a transient recorder 16 in which the data determined in the computer 12 are recorded for a time window and passed on to an evaluation computer 18 to be able to carry out subsequent analysis with the latter.

Figure 2:
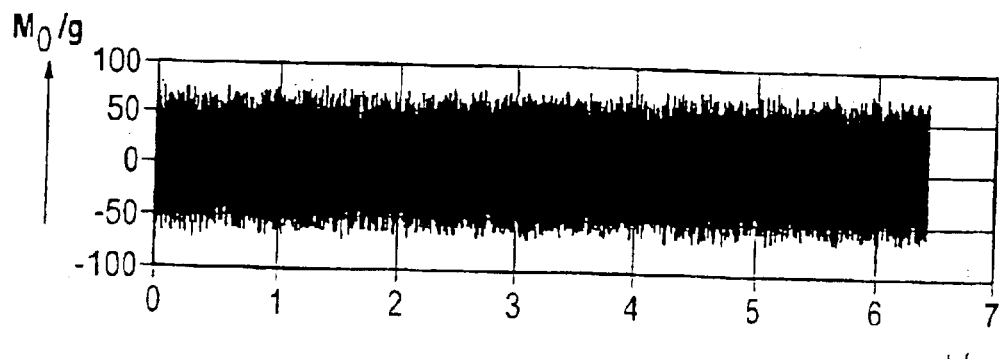
FIG. 2 is a graph in which operating noise detected by the sensor of FIG. 1 is plotted against time in the absence of an external effect.

FIG. 2 shows the amplified measurement signal (background signal $M_0$) detected by a sensor 4 for a period of approximately 6.5 s. It is to be gathered from the figure that the normal operating noise reaches a signal amplitude of between 50 and 100 g.

Figure 3:
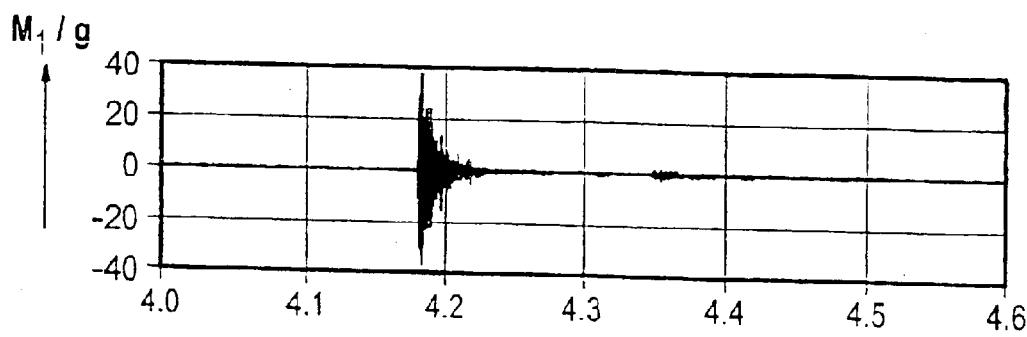
FIG. 3 is a graph in which a measurement signal detected by the sensor of FIG. 1 due to a pulse-type mechanical effect with a turbine at rest is plotted against time.

The measurement signal (useful signal $M_1$) produced by the impact of a tile on a guide blade of the gas turbine with the rotor at rest, that is to say, in the absence of the operating noise normally present, is plotted against time in a diagram in FIG. 3. It is to be gathered from the diagram that the amplitude of this useful signal $M_1$ is substantially smaller than the amplitude of the background signal $M_0$ in accordance with FIG. 2.

Figure 4:
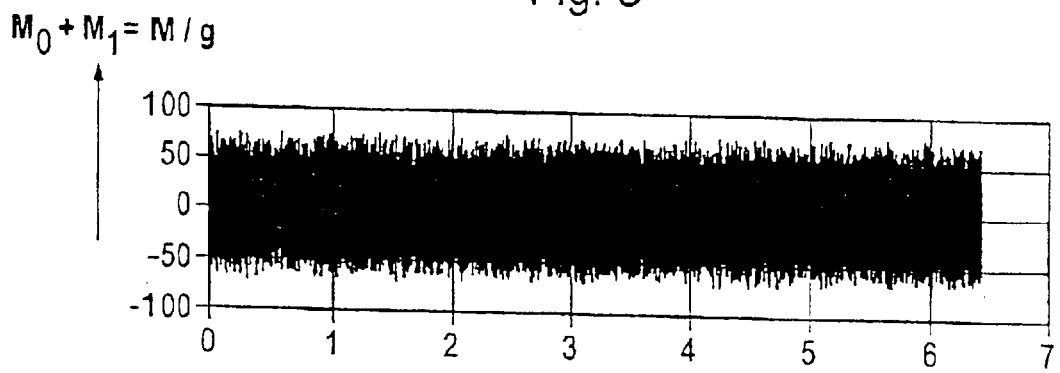
FIG. 4 is a graph in which a superposition of the measurement signal of FIG. 3 and the normal operating noise of FIG. 2 is plotted against time.

FIG. 4 shows the measurement signal M when the background signal $M_0$ and useful signal $M_1$ are superposed. It may be seen from FIG. 4 that monitoring the amplitude of the measurement signal M is not sufficient for the ability to detect an impact reliably.

Figure 5:
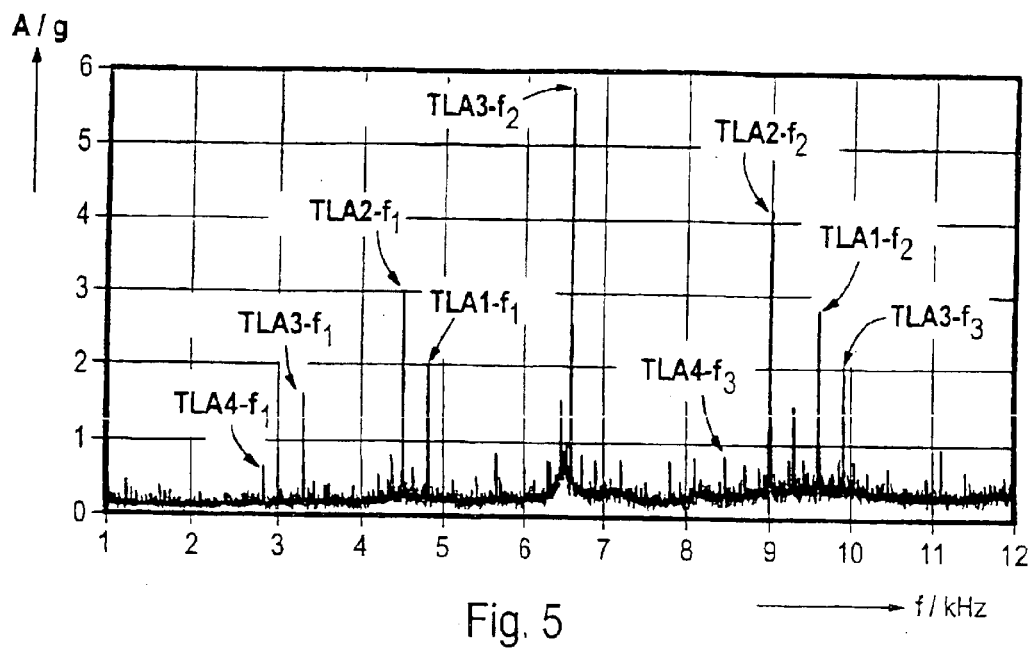
FIG. 5 is a graph illustrating a spectrum of the normal operating noise of a gas turbine.

FIG. 5 illustrates the typical frequency spectrum A(f) of the operating noises occurring with a gas turbine. It is to be seen in FIG. 5 that, occurring in the frequency spectrum A(f) in addition to a basic noise, are significant lines (TLA1-$f_1$, . . . ) that correspond to the fundamental frequencies $f_1$, dependent on rotational speed, of the moving blades, or to multiple harmonics $f_{2,3}$ thereof.

Figure 6:
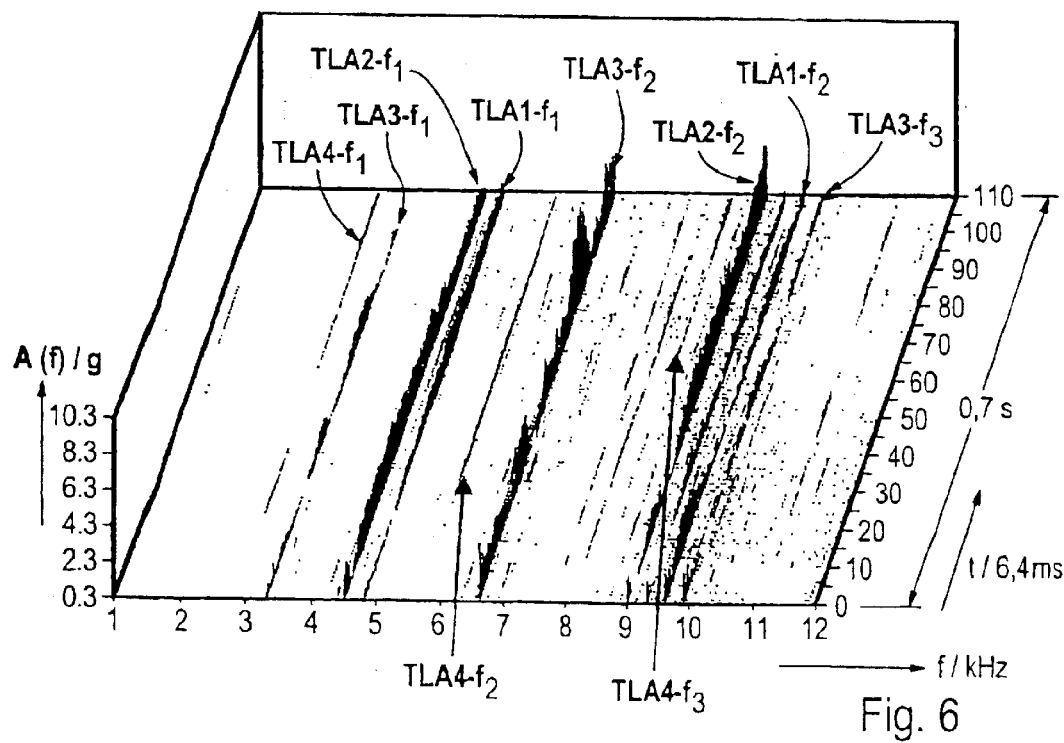
FIG. 6 is a waterfall graph illustrating a time variation of the spectrum of FIG. 5.

It may be gathered from the waterfall diagram in accordance with FIG. 6 that the frequency spectrum A(f) is subject, for its part, to fluctuations and varies with time. In other words, not only the amplitude of the operating noise of the gas turbine, but also specific composition of the noise are subject to a fluctuation in time, which complicates detection of the frequency components originating from the useful signal.

Figure 7:
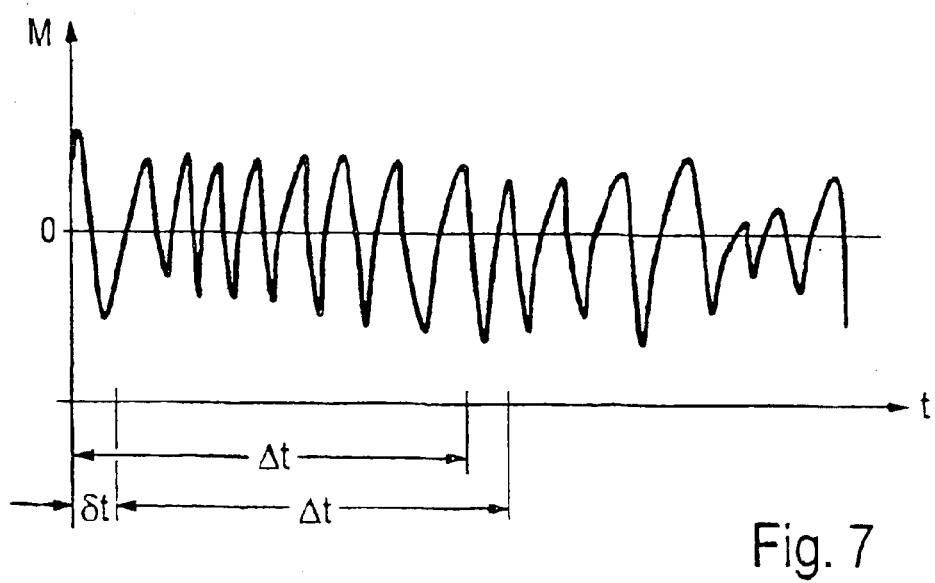
FIG. 7 a graph illustrating the measurement signal of FIG. 3 against time with a higher temporal resolution.

FIG. 7 uses a schematic to explain the first step of the mode of procedure implemented in the computer 12 of FIG. 1. The measurement signal M digitized with a high clock rate (illustrated in analog fashion in the figure for reasons of clarity) is stored for a time segment $\Delta t$, and the section so stored is subjected to fast discrete Fourier transformation. After a time step $\delta t$, the section is updated and a Fourier transformation is carried out anew in an overlapping time segment $\Delta t$ of the same length. Typically, $\Delta t$=50 ms and $\delta t$=6 ms.

Figure 8:
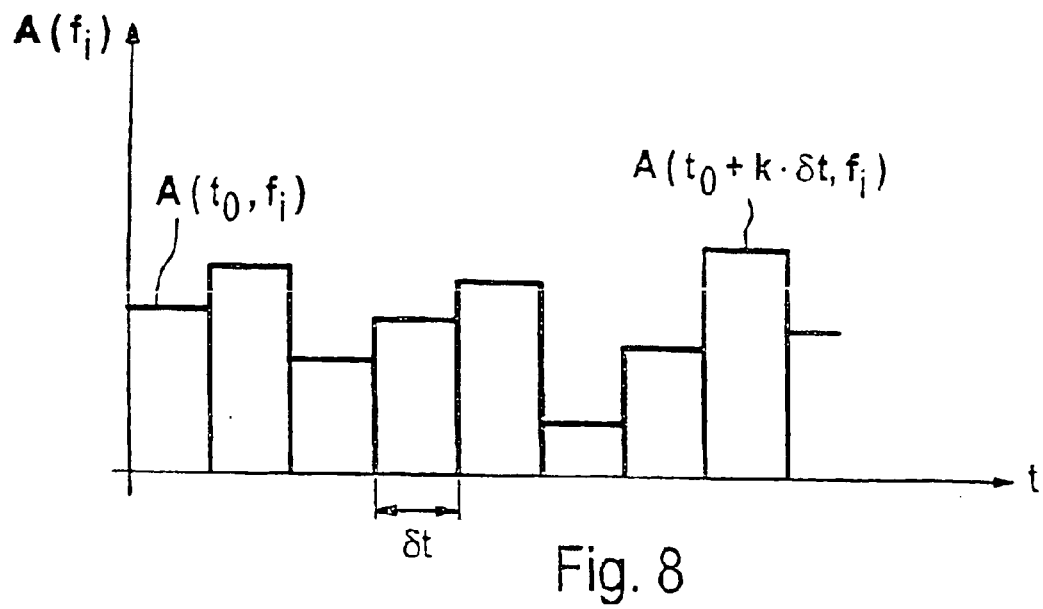
FIG. 8 is a bar graph illustrating the magnitude of the frequency spectrum determined from the measurement signal by fast Fourier transformation against time for a predefined frequency.

The time profile of the magnitude A for a prescribed frequency $f_i$ is illustrated in FIG. 8. It may be gathered from this figure that the magnitude $A(f_i)$ varies with time for this prescribed frequency $f_i$. The time interval $\delta t$ plotted in the figure is the time step in which the fast Fourier transform is updated. In accordance with the invention, the associated value of the magnitude $A(t, f_i)$ where $t=t_0+k\delta t$, k being a natural number, is determined for a multiplicity N of prescribed frequencies $f_i$ or frequency ranges and in temporally sequential time steps $\delta t$ for temporally overlapping time segments $\Delta t$.

Figure 9:
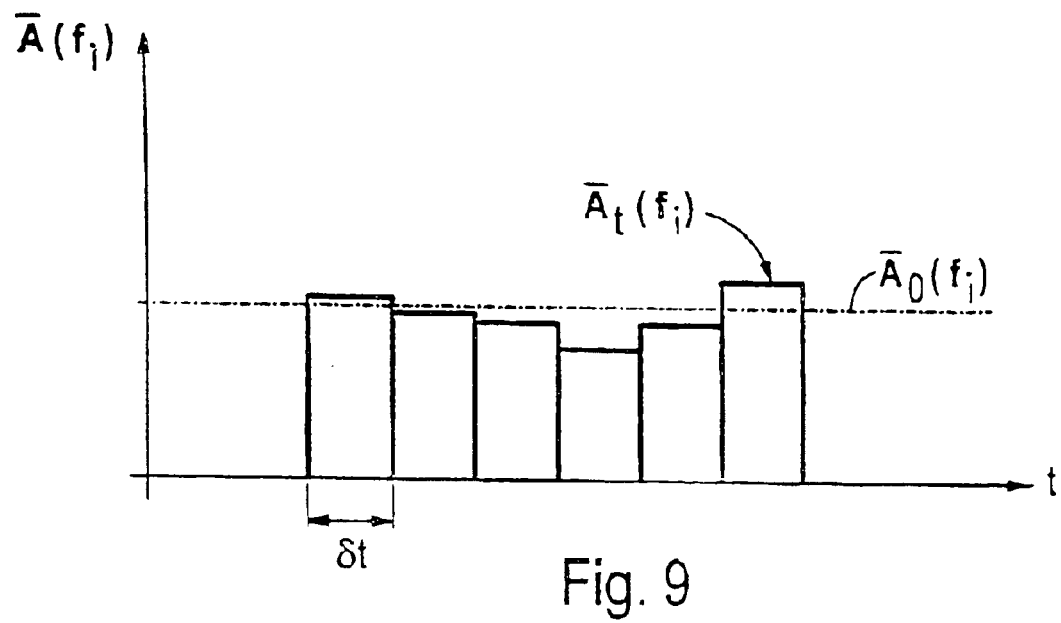
FIG. 9 is a bar graph illustrating a sliding time mean of magnitudes of the spectrum against time for a predefined frequency.

The current value of the magnitude $A(t, f_i)$ so obtained is subtracted in accordance with FIG. 9 from a mean magnitude $\overline{A}(f_i)$ formed for this frequency $f_i$. The mean magnitude $\overline{A}(f_i)$ can be a temporally constant, permanently prescribed mean, as plotted in the diagram with dots and dashes. However, it is particularly advantageous to calculate, as mean, a sliding time mean that has been calculated from a plurality n of respectively preceding magnitudes. It is, thereby, possible for slow changes in the operating noise of the gas turbine, for example, incipient rumbling, to be compensated.

The difference value so calculated:

$$D(t, f_i) = \overline{A}(f_i) - A(t, f_i)$$

is now divided by the standard deviation:

$$s(f_i) = \sqrt{\frac{\sum_{j=1}^{n} (D(t_j, f_i))^2}{(n-1)}} \ .$$

$$\overline{D}(t, f_i) = D(t, f_i)/s(f_i)$$

$\overline{D}(t, f_i)$ is a normalized deviation of the magnitude A from the mean $\overline{A}$.

The magnitudes A n of preceding spectra are evaluated to determine the standard deviation $s(f_i)$. In other words, the standard deviation $s(f_i)$ is updated continuously with the aid of n preceding measurements. As an alternative thereto, the standard deviation $s(f_i)$ can be determined once for each frequency $f_i$ in a "calibration", and be stored as a frequency-specific constant.

In an advantageous refinement, the normalized deviation $\overline{D}(t, f_i)$ is additionally averaged in a frequency range $f_{i-L}$, $f_{i-L+1}, \ldots, f_{i+L}$ surrounding the frequency $f_i$ and being of 2L+1 frequencies, and a mean normalized deviation $\underline{\overline{D}}(t, f_i)$ is determined by the equation:

$$\underline{\overline{D}}(t, f_i) = \frac{1}{1+2L} \sum_{k=-L}^{k=+L} \overline{D}(t, f_{i+k}).$$

This additional computing step leads to a reduction in the level and breadth of fluctuation of the normalized deviation in the regions in which only background signals are present. The useful signal components are not markedly varied by the averaging in the frequency domain because they always occur in a fashion concentrated about neighboring frequency lines. This measure results, once more, in an improvement to the signal/background ratio by a further 10 to 15 dB.

The normalized deviation $\overline{D}(t, f_i)$ or $\underline{\overline{D}}(t, f_i)$ so determined is squared and summed over all the discrete frequencies $f_i$:

$$S(t) = \sum_{i=1}^{N} \overline{D}(t, f_i)^2 / N \quad (a)$$

or $$S(t) = \sum_{i=1}^{N} \underline{\overline{D}}(t, f_i)^2 / N. \quad (b)$$

A parameter value K(t) is now derived from this sum S(t) by extracting the root:

$$K(t) = \sqrt{S(t)}.$$

The latter serves as evaluation function for the occurrence of an impact. As an alternative thereto, it is also possible for the evaluation function to be formed as the difference between the parameter value K(t) and a sliding time mean $\overline{K}(t)$ of this parameter value K(t):

$$B(t) = K(t) - \overline{K}(t),$$

and for it to serve as characteristic for the occurrence of an impact.

Figure 10:
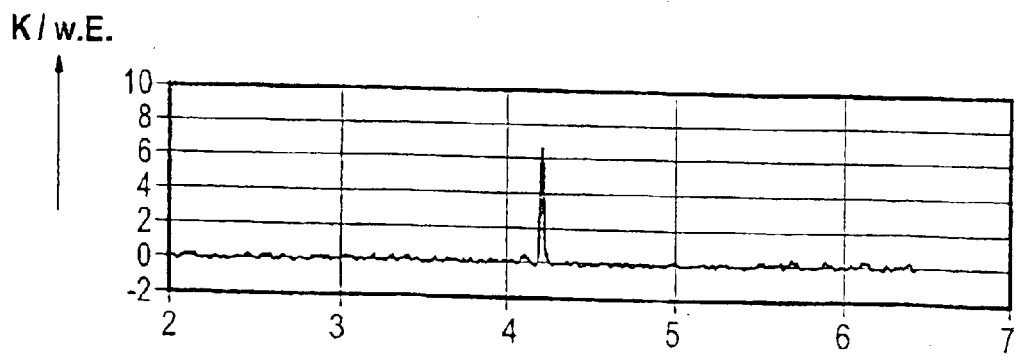
FIG. 10 is a time profile graph of an evaluation function derived from the signal analysis according to the invention.

The evaluation function K(t) so obtained and with the aid of the mean normalized deviation $\underline{\overline{D}}$ (equation (b)) is plotted against time t in FIG. 10. A continuous curve results in the illustration because of the large time scale ($\delta t \ll 1$ s). It is to be seen in FIG. 10 that the evaluation function for t=4.2 s exhibits a significant maximum such that the occurrence of a pulse-type event can be reliably detected. A corresponding threshold value $K_0$ can be set just above the noise level. The distance, obtained by the method according to the invention, between the useful signal and noise is 25 to 30 dB in the example illustrated.

We claim:

1. A method for detecting a pulse-type mechanical effect on a system part, which comprises:

continuously detecting, with a sensor disposed on the system part, an operating noise present in the system part and converting the detected operating noise into a measurement signal;

determining a magnitude of a frequency spectrum of the measurement signal in temporally sequential time segments at predefined frequencies;

determining a deviation of the magnitude from a mean magnitude for each time segment and each of the predefined frequencies;

deriving a single evaluation function common for all frequencies for each time segment from the deviations determined for each of the predefined frequencies, each deviation making a contribution to the evaluation function; and comparing the evaluation function with a threshold value, and utilizing an overshooting of the threshold value as an index for a presence of a pulse-type signal component indicating the mechanical effect.

2. The method according to claim 1, wherein the sequential time segments overlap one another.

3. The method according to claim 1, which further comprises carrying out the determining steps and the deriving and comparing steps with sequential time segments overlapping one another.

4. The method according to claim 1, which further comprises determining the mean magnitude for each of the predefined frequencies from the magnitudes determined in different time segments by forming a sliding time mean.

5. The method according to claim 1, which further comprises:

for each of the predefined frequencies, determining a standard deviation of the magnitudes from the mean magnitude for a plurality of sequential time segments and determining a normalized deviation of the magnitudes from the mean magnitude with aid of the standard deviation;

forming therefrom a current parameter value for each time segment by forming a sum of squares of each normalized deviation over each of the predefined frequencies; and deriving from the parameter value the evaluation function.

6. The method according to claim 5, which further comprises deriving a sliding mean parameter value over a number of time segments, and forming the evaluation function from a difference between the mean parameter value and the current parameter value.

7. A device for detecting a pulse-type mechanical effect on a system part, comprising:

at least one sensor to be disposed on the system part, said at least one sensor continuously detecting and measuring an operating noise present in the system part and generating measurement signals therefrom;

an A/D converter connected to said at least one sensor, said A/D converter digitizing said measurement signals detected by said at least one sensor and outputting digitized measurement signals;

a digital device connected to said A/D converter and receiving said digitized measurement signals, said digital device being programmed to:

determine a magnitude of a frequency spectrum of said measurement signals in temporally sequential time segments for predefined frequencies;

determine a deviation of the magnitude from a mean magnitude for each time segment and each of said predefined frequencies, derive a single evaluation function common for all frequencies for each time segment from the deviations determined for each of said predefined frequencies each deviation making a contribution to said evaluation function; and comparing the evaluation function with a threshold value and passing on an alarm signal upon an overshooting of said threshold value.

8. The device according to claim 7, wherein said digital device is programmed to provide mutually overlapping time segments.

9. The device according to claim 7, wherein said digital device is programmed to determine said mean magnitude for each of said predefined frequencies by forming a sliding time mean from said magnitudes determined in different time segments.

10. The device according to claim 7, wherein said digital device is programmed to implement an algorithm:

determining a standard deviation of said magnitudes from said mean magnitude for each of said predefined frequencies for a plurality of sequential time segments;

determining a normalized deviation of said magnitudes from said mean magnitude by dividing said deviation by said standard deviation;

deriving a current parameter value for each time segment by forming a sum of squares of each normalized deviation over each of said predefined frequencies; and generating said evaluation function from said current parameter value.

11. The device according to claim 10, wherein said algorithm further comprises forming a sliding mean parameter value and generating said evaluation function from a difference between said mean parameter value and said current parameter value.

* * * * *